United States Patent [19]
Sakamoto et al.

[11] Patent Number: 6,040,986
[45] Date of Patent: Mar. 21, 2000

[54] NON-CONTACT POWER TRANSMITTING DEVICE HAVING SIMPLIFIED SELF-OSCILLATION FEEDBACK LOOP WHICH INTERRUPTS POWER TRANSMISSION WHEN NO LOAD IS PRESENT

[75] Inventors: Hiroshi Sakamoto, 6-388-3, Tsuboi, Kumamoto-shi, kumamoto, Japan; Hideaki Abe, Osaka, Japan

[73] Assignees: Matsushita Electric Works, Ltd., Osaka; Hiroshi Sakamoto, Kumamoto, both of Japan

[21] Appl. No.: 09/200,474

[22] Filed: Nov. 27, 1998

[30] Foreign Application Priority Data

Dec. 9, 1997 [JP] Japan ................................. 9-339004

[51] Int. Cl.[7] ................................................. H02M 3/335
[52] U.S. Cl. ................................................. 363/20; 363/21
[58] Field of Search ................................. 363/49, 21, 19, 363/20

[56] References Cited

U.S. PATENT DOCUMENTS 5,225,972  7/1993  Sakamoto .................................. 363/18
5,488,552  1/1996  Sakamoto et al. ........................ 363/21

FOREIGN PATENT DOCUMENTS 6-178464   6/1994  Japan.
6-311658  11/1994  Japan.
8-19185    1/1996  Japan.
2671809    7/1997  Japan.
10-191575  7/1998  Japan.
10-215530  8/1998  Japan.

OTHER PUBLICATIONS

"A MAGNETIC COUPLED CHARGER WITH NO–LOAD PROTECTION" Sakamoto et al., Institute of Electrical Engineers of Japan; 12/12/97. (full translation).

*Primary Examiner*—Shawn Riley
*Attorney, Agent, or Firm*—Sughrue, Mion, Zinn, Macpeak & Seas, PLLC

[57] ABSTRACT

A power supplying section has a signal transmitting secondary coil which is not inductively coupled to a power transmitting primary coil, and actuates as a feedback coil of a switching element. A load section has a power transmitting secondary coil arranged so as to be confronted with the power transmitting primary coil when the load section is attached to the power supplying section, and also has a signal transmitting primary coil so as to be confronted with the signal transmitting secondary coil when the load section is attached to the power supplying section. When the load section is not attached to the power supplying section, the voltage is not induced in the signal transmitting secondary coil as the feedback coil, and the switching of the switching element is intermittently carried out.

5 Claims, 8 Drawing Sheets

NON-CONTACT POWER TRANSMITTING DEVICE HAVING SIMPLIFIED SELF-OSCILLATION FEEDBACK LOOP WHICH INTERRUPTS POWER TRANSMISSION WHEN NO LOAD IS PRESENT

BACKGROUND OF THE INVENTION

1. Field of the Invention

This invention relates to a non-contact power transmitting device for electrical equipment which is suitably employed in a battery charger, or a water facility such as a bath room.

2. Description of the Related Art

Heretofore, a non-contact power transmitting device is popularly employed in which a power supplying section having a power transmitting primary coil, and a load section having a power transmitting secondary coil are separately provided, and when the load section is attached to the power supplying section the primary coil and the secondary coil are magnetically coupled to each other, and power is transmitted from the self-oscillating power supplying section to the load section by electromagnetic induction. The non-contact power transmitting device is applied to electrical equipment employed especially in a water facility.

In such a non-contact power transmitting device, it is preferable that, when the load section is not attached to the power supplying section, the self-oscillation of the power supplying section is stopped, or the self-oscillation is weakened. This is because, if the self-oscillation is continued although the load section is no t attached to the power supplying section, then power loss occurs with the power supplying section; that is, energy loss is involved, and accordingly if a metal piece is arranged near the power supplying section, the metal piece is heated by induction heating action.

In order to overcome this difficulty, the following non-contact power transmitting device has been proposed in the art: In addition to the power transmitting coils, a pair of signaling coils are provided. When, with the load attached to the power supplying section, power is transmitted to the load section by the electromagnetic induction of a pair of power transmitting coils of the power supplying section and the load section, the power is employed to drive the control circuit of the load section. And a control signal outputted by the control circuit is returned from the load section to the power supplying section with the aid of the pair of signaling coils. The oscillation operation is controlled according to the control signal thus returned, thereby to detect the aimed load section (cf. Japanese Patent Publication No. Hei. 6-311658).

In the above-described device under Japanese Patent Publication No. Hei. 6-311658, it is necessary to additionally provide a circuit for detecting the load section, and a circuit for controlling the oscillation. Accordingly, its circuit is unavoidably intricate; that is, the device is high in manufacturing cost.

On the other hand, Japanese Patent Publication No. Hei. 6-1768464 has disclosed a non-contact power transmitting device of which circuitry is relatively simple. The device is to synchronously control the resonance frequency of the load section and the oscillation frequency of the power supplying section, and is applied to the case where the gap between the power supplying section and the load section. Accordingly, in the device, even if the load section is not attached to the power supplying section, the oscillation is continued in the power supplying section. Hence, the device is different from the one that the load section is detected to stop or weaken the oscillation.

As is apparent from the above description, there has been a strong demand for the provision of a non-contact power transmitting device in which, in the case where the load section is not attached to the power supplying section, a simple circuit stops or weakens the oscillation of the power supplying section.

SUMMARY OF THE INVENTION

Accordingly, an object of the invention is to eliminate the above-described difficulties accompanying conventional non-contact power transmitting devices. More specifically, an object of the invention is to provide a non-contact power transmitting device in which its self-oscillation feedback loop is newly designed, so that the circuitry is simple, and so that when the load is not attached to the power supplying section the self-oscillation of the power supplying section is weakened.

According to the present invention, there is provided a non-contact power transmitting device using: a voltage source; a start resistor connected to said voltage source; a first capacitor connected to said voltage source; a power transmitting primary coil; a signal transmitting secondary coil which is not inductively coupled to said power transmitting primary coil, and a switching element having a control terminal. The start resistor and the first capacitor apply a bias voltage to the control terminal of the switching element, so that when the bias voltage applied to said control terminal becomes higher than a threshold voltage, the switching element switches a current from the voltage source to the power transmitting primary coil. A load section of the device is made up of a power transmitting secondary coil and a signal transmitting primary coil being electrically or magnetically coupled to said power transmitting secondary coil. Thus, when the load section is attached to the power supplying section, the power transmitting primary coil and the power transmitting secondary coil are magnetically coupled to each other, so that power is transmitted from the power supplying section to the load section by electromagnetic induction. Also, the signal transmitting secondary coil is magnetically coupled to the signal transmitting primary coil and electrically coupled to the control terminal as a feedback coil, and the power transmitting primary coil, the power transmitting secondary coil, the signal transmitting primary coil, and the signal transmitting secondary coil form a feedback loop.

In the case where the load section is attached to the power supplying section, the first capacitor is charged through the start resistor by the voltage source, and the bias voltage resulting from this charge voltage is applied to the control terminal of the switching element, so as to turn on the latter. When as the switching element is turned on as described above, a voltage is induced in the power transmitting primary coil. Owing to the induction voltage, a voltage is induced in the signal transmitting primary coil which is electrically or magnetically coupled to the power transmitting primary coil. Owing to the voltage thus induced, a voltage is induced in the signal transmitting secondary coil of the power supplying section, which is magnetically coupled to the signal transmitting primary coil. This signal transmitting secondary coil is electrically connected, as a feedback coil, to the control terminal of the switching element, and the power transmitting primary coil, the power transmitting secondary coil, the signal transmitting primary coil, and signal transmitting secondary coil form the feedback loop of the self-oscillation circuit, whereby the switching of coil current by the switching element is continuously carried out.

On the other hand, in the case where the load section is not attached to the power supplying section, even if current flows in the power transmitting primary coil to turn on the switching element, the signal transmitting secondary coil is not inductively coupled to the power transmitting primary coil, and the power transmitting primary coil, the power transmitting secondary coil, the signal transmitting primary coil, and the signal transmitting secondary coil do not form the feedback loop of the self-oscillation circuit. Therefore, no voltage is induced in the feedback coil, namely, the signal transmitting secondary coil. Accordingly, only when the bias voltage which is obtained by charging the capacitor of the bias voltage circuit through the start resistor reaches the threshold voltage of the switching element, is the latter turned on. Thus, the switching of coil current by the switching element is carried out only intermittently.

Hence, when the load section is not attached to the power supplying section, the strength of self-oscillation is decreased by a simple circuit.

It is preferable that the load section has a control circuit which is connected to the signal transmitting primary coil, and controls a voltage level of the signal transmitting primary coil.

In the case where the load section is attached to the power supplying section, the voltage level of the signal transmitting primary coil is controlled. Therefore, the induction voltage level of the signal transmitting secondary coil of the power supplying section operating as a feedback coil is controlled. Accordingly, for instance by increasing the induction voltage level, the oscillation degree is increased; that is, the oscillation of the self-oscillation circuit can be controlled.

Further, it is preferable that the power supplying section has a second capacitor which is connected in parallel to the power transmitting primary coil.

In this case, the second capacitor connected in parallel to the power transmitting primary coil forms a resonance circuit, so that with the load section attached to the power supplying section, the self-oscillation is carried out with high efficiency.

Still further, the signal transmitting secondary coil may be arranged outside of the magnetic-flux loop of the power transmitting primary coil, and the signal transmitting primary coil may be arranged in such a manner that, with the load section attached to the power supplying section, the signal transmitting primary coil is confronted with the signal transmitting secondary coil.

In this case, the signal transmitting secondary coil is arranged outside of the magnetic-flux loop of the power transmitting primary coil, so that the circuit is simply realized that the signal transmitting secondary coil is not inductively coupled to the power transmitting primary coil. On the other hand, the signal transmitting primary coil is arranged confronted with the signal transmitting secondary coil with the load section attached to the power supplying section, so that, when the load section is attached to the power supplying section, the signal transmitting primary coil and the signal transmitting secondary coil are magnetically coupled to each other with a simple circuit.

Still further, the signal transmitting secondary coil may be arranged inside of the magnetic-flux loop of the power transmitting primary coil, and the signal transmitting primary coil may be arranged in such a manner that, with the load section attached to the power supplying section, the signal transmitting primary coil is confronted with the signal transmitting secondary coil.

In this case, the signal transmitting secondary coil is arranged inside of the magnetic-flux loop of the power transmitting primary coil, so that the circuit is simply realized that the signal transmitting secondary coil is not inductively coupled to the power transmitting primary coil. On the other hand, the signal transmitting primary coil is arranged confronted with the signal transmitting secondary coil with the load section attached to the power supplying section, so that, when the load section is attached to the power supplying section, the signal transmitting primary coil and the signal transmitting secondary coil are magnetically coupled to each other with a simple circuit.

BRIEF DESCRIPTION OF THE DRAWINGS

In the accompanying drawings:

FIG. 8A is a diagram showing the exploded coils in a power supplying section and in a load section, and FIG. 8B is a diagram showing the assembled coils;

DETAILED DESCRIPTION OF THE PREFERRED EMBODIMENTS

Figure 1:
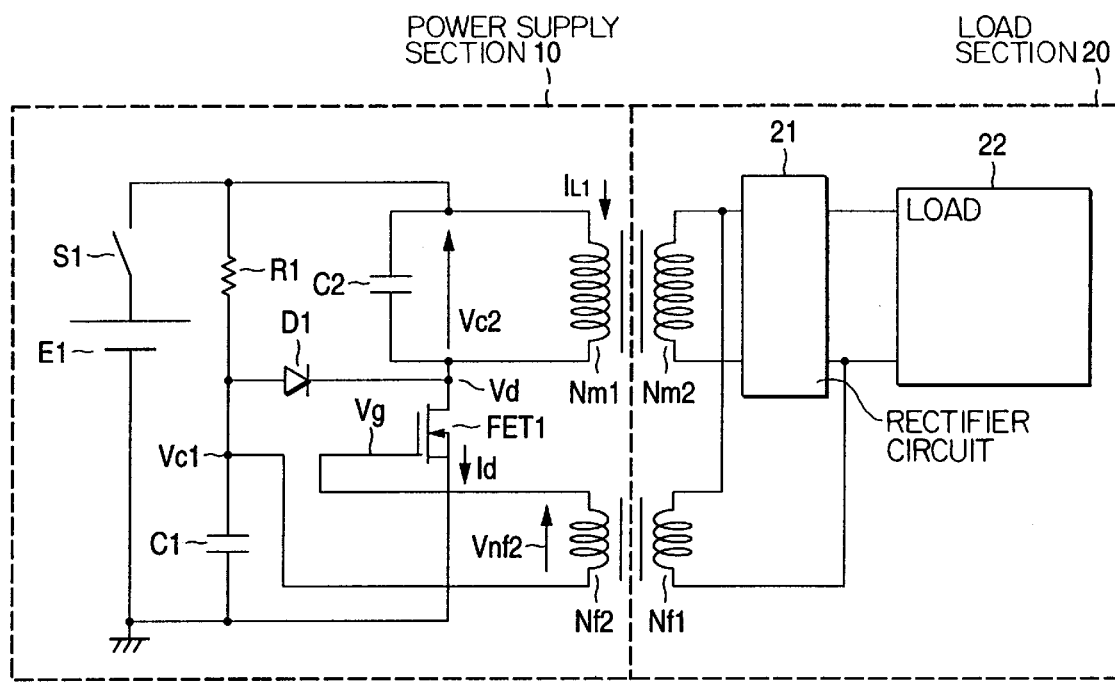
FIG. 1 is a circuit diagram showing a non-contact power transmitting device, which constitutes an embodiment of the invention.
Figure 2A:
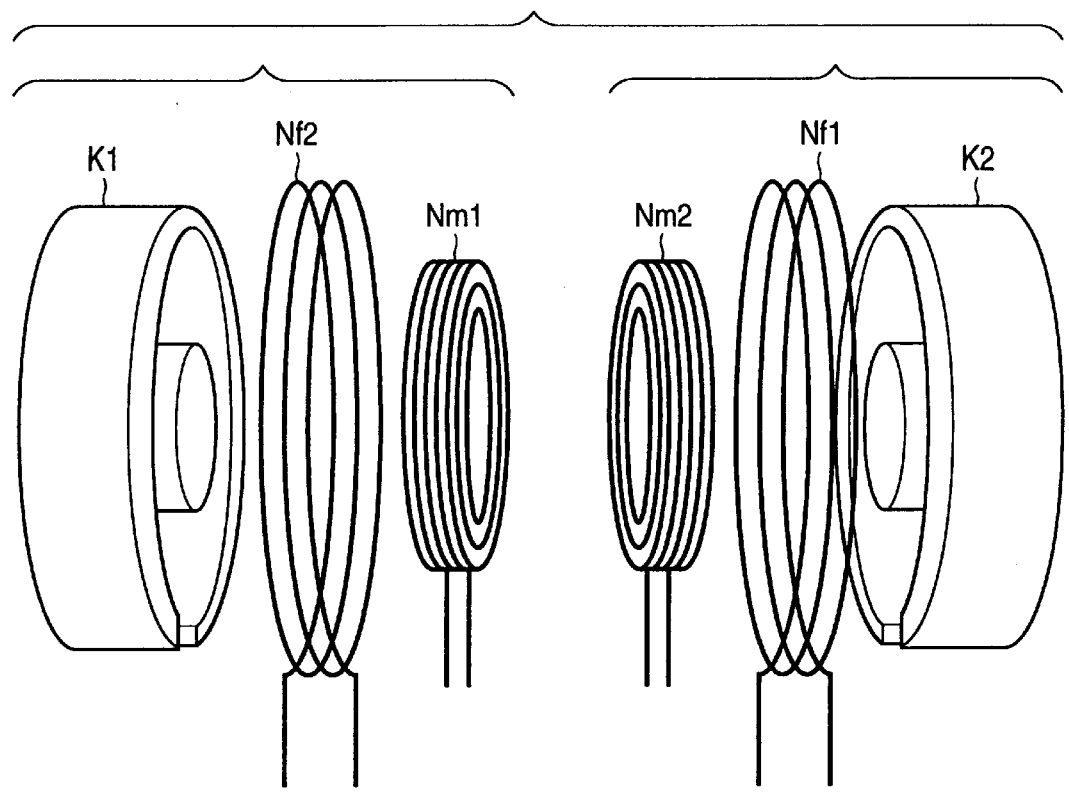
FIG. 2A is a diagram showing the exploded coils in a power supplying section and in a load section.
Figure 2B:
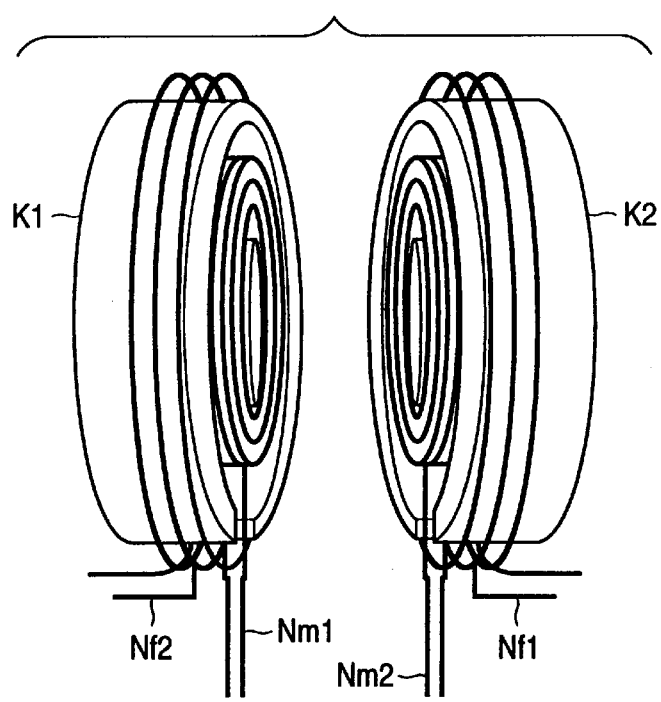
FIG. 2B is a diagram showing the assembled coils.

FIG. 1 is a circuit diagram of a non-contact power transmitting device, which constitutes an embodiment of the invention. FIGS. 2A and 2B are diagrams showing the arrangement of the coils of a power supplying section and a load section.

As shown in FIG. 1, the device of the invention comprises a power supplying section 10 and a load section 20 which are provided separately. The load section 20 is detachably attached to the power supplying section 20.

First, the arrangement of the power supplying section 10 will be described. The power supplying section 10 comprises a DC voltage source E1, and a power transmitting primary coil Nm1, thus constituting a self-oscillation resonance inverter operating as class C condition. When the load section 20 is attached to the power supplying section 10, the power supplying section 10 supplies power to the load section by electromagnetic induction.

The DC voltage source E1 and a power switch S1 form a series circuit, which is shunted by a series circuit consisting of a start resistor R1 and a capacitor C1. The series circuit consisting of the start resistor R1 and the capacitor C1 forms a bias voltage circuit. At the connecting point of the start resistor R1 and the capacitor C1, a bias voltage $V_{C1}$ is produced which is due to the charge voltage of the capacitor C1.

The series circuit comprising the DC voltage source E1 and the power switch S1 is shunted by a series circuit consisting of the power transmitting primary coil Nm1 and a switching element FET1. The power transmitting primary coil Nm1 is shunted by a capacitor C2, thus forming a resonance circuit.

A signal transmitting secondary coil Nf2 are connected between the connecting point of the start resistor R1 and the capacitor C1; i.e., the point of generation of a bias voltage $V_{C1}$ and the gate of the switching element FET1, serving also as a feedback coil.

The aforementioned resonance circuit, the switching element FET1 and the signal transmitting secondary coil Nf2 form a self-excitation oscillation circuit.

The anode of a diode D1 is connected to the connecting point of the start resistor R1 and the capacitor C1. The cathode of the diode D1 is connected to the drain of the switching element FET 1. The diode D1 forms an oscillation stabilizing bias control circuit.

Now, the arrangement of the load section 20 will be described. The load section 20 comprises a power transmitting secondary coil Nm2, the signal transmitting primary coil Nf1, a rectifier circuit 21, and a load 22.

The rectifier circuit 21 is to rectify the voltage which is induced in the power transmitting secondary coil Nm2 by electromagnetic induction. The load 22 is an electric motor or the like, and is driven by the voltage which is rectified by the rectifier circuit 21.

The signal transmitting primary coil Nf1 is connected in parallel to the power transmitting secondary coil Nm2; that is, the signal transmitting primary coil Nf1 is electrically coupled to the power transmitting secondary coil Nm 2. Therefore, when a voltage is induced across the power transmitting secondary coil Nm2, a voltage is induced across the signal transmitting primary coil Nf1, too.

The arrangement of the coils will be described with reference to FIGS. 2A and 2B. The power supplying section 10 and the load section has, for instance, a guide structure (not shown) so that the load is regularly set with respect to the power supplying section 10.

The power transmitting primary coil Nm1 of the power transmitting section 10, and the power transmitting secondary coil Nm2 of the load section 20 are arranged in such a manner that, when the load section 20 is attached to the power supplying section 10, they are confronted with each other.

Figure 3:
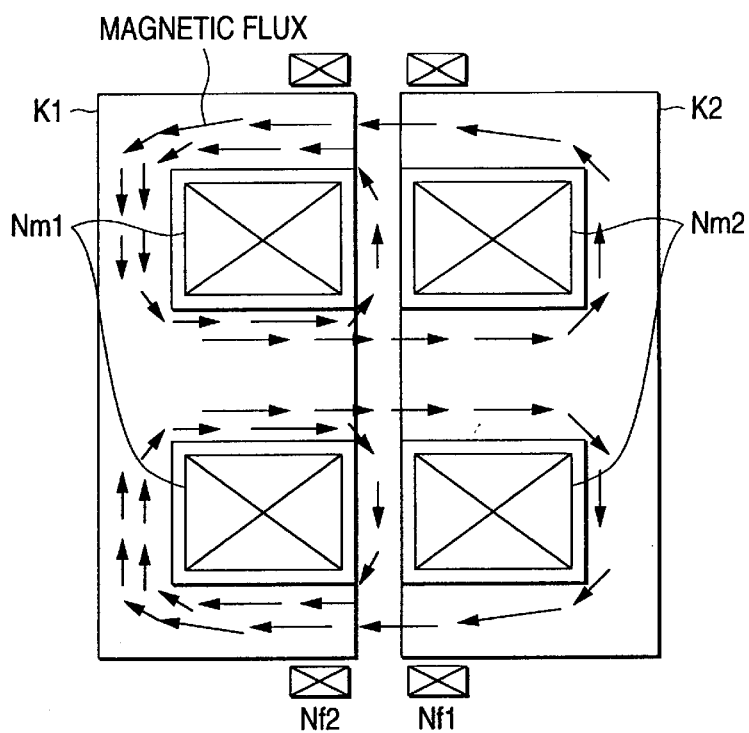
FIG. 3 is a schematic sectional view of the coils in the power supplying section and in the load section magnetic together with magnetic fluxes.

The signal transmitting secondary coil Nf2 of the power supplying section 10 is arranged outside a transformer pot core K1 and the power transmitting primary coil Nm1 is wound inside of the transformer pot core K1 as shown in FIG. 2A; that is, outside the magnetic-flux loop attributing to the power transmitting primary coil Nm1, and the magnetic-flux loop attributing to the transformer of the power transmitting primary and secondary coils Nm1 and Nm2 as shown in FIG. 3.

The signal transmitting primary coil Nf1 of the load section 20 is so arranged that it confronts with the signal transmitting secondary coil Nf2 of the power supplying section 10 when the load section 20 is attached to the power supplying section 10; that is, it is arranged outside a transformer pot core K2 and the power transmitting secondary coil Nm2 is wound inside of the transformer pot core K2 as shown in FIG. 2A.

Accordingly, the signal transmitting secondary coil Nf2 is arranged outside the magnetic-flux loop which is formed by the transformer of the power transmitting primary and secondary coils Nm1 and Nm2; that is, the magnetic fluxes are canceled out therein, and no magnetic flux extends across the signal transmitting secondary coil Nf2 as shown in FIG. 3. Hence, no electromagnetic force is induced in the signal transmitting secondary coil Nf2 by the magnetic flux formed by the power transmitting primary coil Nm1. In other words, the signal transmitting secondary coil Nf2 and the power transmitting primary coil Nm1 are not electrically nor magnetically coupled to each other, or the coupling of them is to the extent that can be disregarded (only the amount of the flux leakage).

On the other hand, when the load section 20 is coupled to the power supplying section 10, the power transmitting primary coil Nm1 is magnetically coupled to the power transmitting secondary coil Nm2, while the signal transmitting primary coil Nf1 is magnetically coupled to the signal transmitting secondary coil Nf2.

Figure 4:
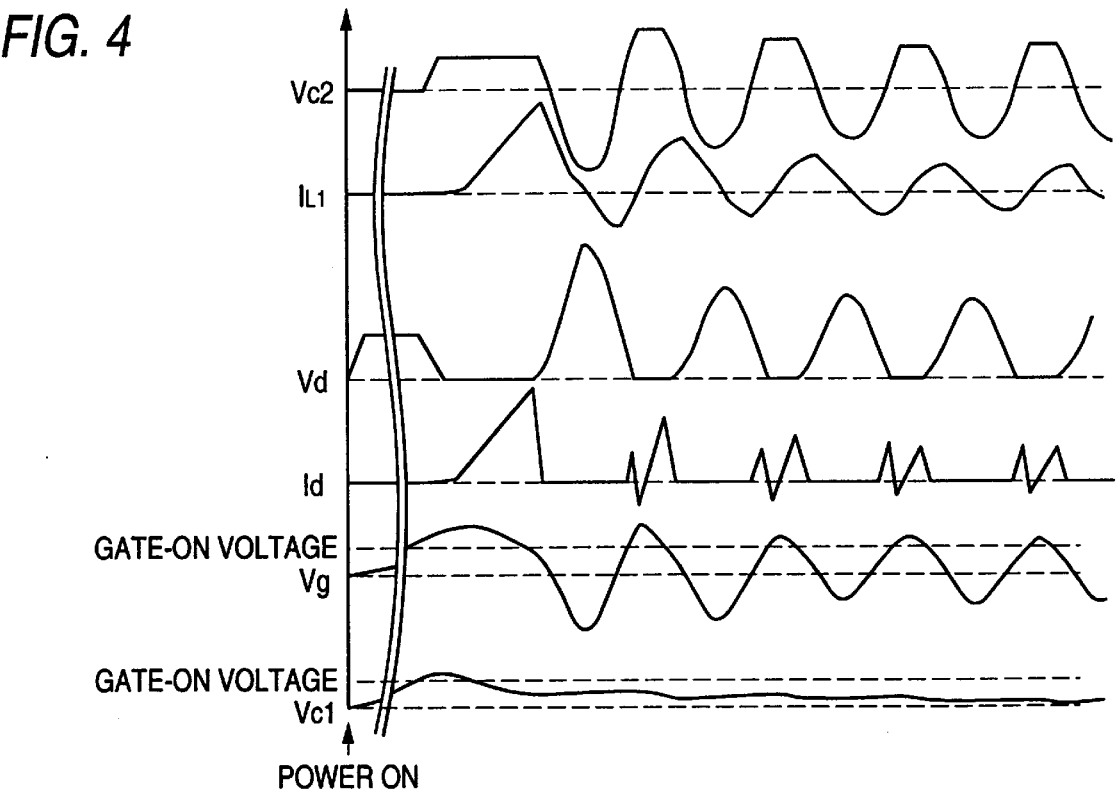
FIG. 4 is a waveform diagram showing waves at various points of the power supplying section in the case where the load section is attached to the power supplying section.

The operation of the device in the case where the load section 20 is attached to the power supplying section 10 will be described with reference to FIGS. 1 and 4. FIG. 4 shows the waveforms of various parts of the power supplying section when the load section is attached to the power supplying section.

When the power switch S1 is turned on, the capacitor C1 is charged through the start resistor R1 by the DC voltage source E1. In this case, no voltage is developed in the signal transmitting secondary coil Nf2 of the power supplying section 10, and therefore the gate voltage $V_g$ of the switching element FET1 is equal to the bias voltage $V_{C1}$.

When the gate voltage $V_g$ increases to a threshold voltage which turns on the switching element FET1, the switching element FET1 is turned on, whereby the drain voltage $V_d$ is substantially equal to the earth (ground) potential. In this case, the resonance voltage $V_{C2}$ of the capacitor C2 is substantially equal to the voltage of the DC voltage source E1, and a coil current $I_{L1}$, which increases monotonously, starts flowing to the power transmitting primary coil Nm1 of the power supplying section.

When the coil current $I_{L1}$ flows to the power transmitting primary coil Nm1 of the current supplying section 10, a voltage is induced in the power transmitting secondary coil Nm2 of the load section 20 by electromagnetic induction, whereby a voltage is induced in the signal transmitting primary coil Nf1 of the load section 20 which is electrically connected thereto.

Because of the voltage thus induced, a voltage $V_{nf2}$ is induced in the signal transmitting secondary coil Nf2 of the power supplying section 10 by electromagnetic induction which is magnetically coupled to the signal transmitting primary coil Nf1 of the load section 20. In this case, the gate voltage $V_g$ is $V_{C1}+V_{nf2}$, so that the switching element FET1 is stably in "on" state.

On the other hand, since the drain voltage $V_d$ is substantially the ground potential, and therefore the capacitor C1 is discharged through the diode D1 and the "on" resistance of the switching element FET1, so that the bias voltage $V_{C1}$ is decreased. Since the discharge current depends on the resistance of the path through which the current flows, when it is required to increase the discharge time, a resistance element is connected in series to the diode D1.

As the capacitor C1 is discharged, the bias voltage $V_{C1}$ is gradually decreased, and accordingly the gate voltage $V_g$ is also decreased. When the gate voltage $V_g$ is decreased to the threshold voltage which turns off the switching element FET1, then the "on" resistance of the switching element FET1 starts increasing, whereby the drain voltage $V_d$ is increased.

As the drain voltage $V_d$ increases, the resonance voltage $V_{C2}$ of the capacitor C2; i.e, the power transmitting primary coil Nm1. Accordingly, the induction voltage of the power transmitting secondary coil Nm2 decreases, so that the voltage of the signal transmitting primary coil Nf1 decreases. As a result, the induction voltage $V_{nf2}$ of the signal transmitting secondary coil Nf2 starts decreasing, and therefore the gate voltage $V_g$ is further decreases, so that the switching element FET1 is quickly placed in "off" state.

Hence, as shown in FIG. 4, the waveform of the resonance voltage $V_{C2}$ of the capacitor C2 becomes a sine wave by the resonance action of the capacitor C2 and the power transmitting primary coil Nm1, and the waveform of the coil current $I_{L1}$ flowing in the power transmitting primary coil Nm1 becomes a sine wave, too.

During the period when (the drain voltage $V_d$)>(the bias voltage $V_{C1}$), the charging of the capacitor C1 by the drain voltage $V_d$ is inhibited by means of the diode D1; however, the charging current from the DC voltage source E1 through the start resistor R1 to the capacitor flows at all times, and the bias voltage $V_{C1}$ is increased.

When the resonance voltage $V_{C2}$ of the capacitor C2 comes near the end of one cycle, the drain voltage $V_d$ comes near the earth potential, and by the induction voltage of the power transmitting primary coil Nm1, the voltage $V_{nf2}$ of the signal transmitting secondary coil Nf2 is increased in the feedback loop of the power transmitting secondary coil Nm2, the signal transmitting primary coil Nf1 and the signal transmitting secondary coil Nf2. As a result, the gate voltage $V_g$ is increased, and the switching element FET1 is turned on again.

The above-described operations are repeatedly carried out to continue the oscillation, so that power is supplied from the power supplying section 10 to the load section 20.

Figure 5:
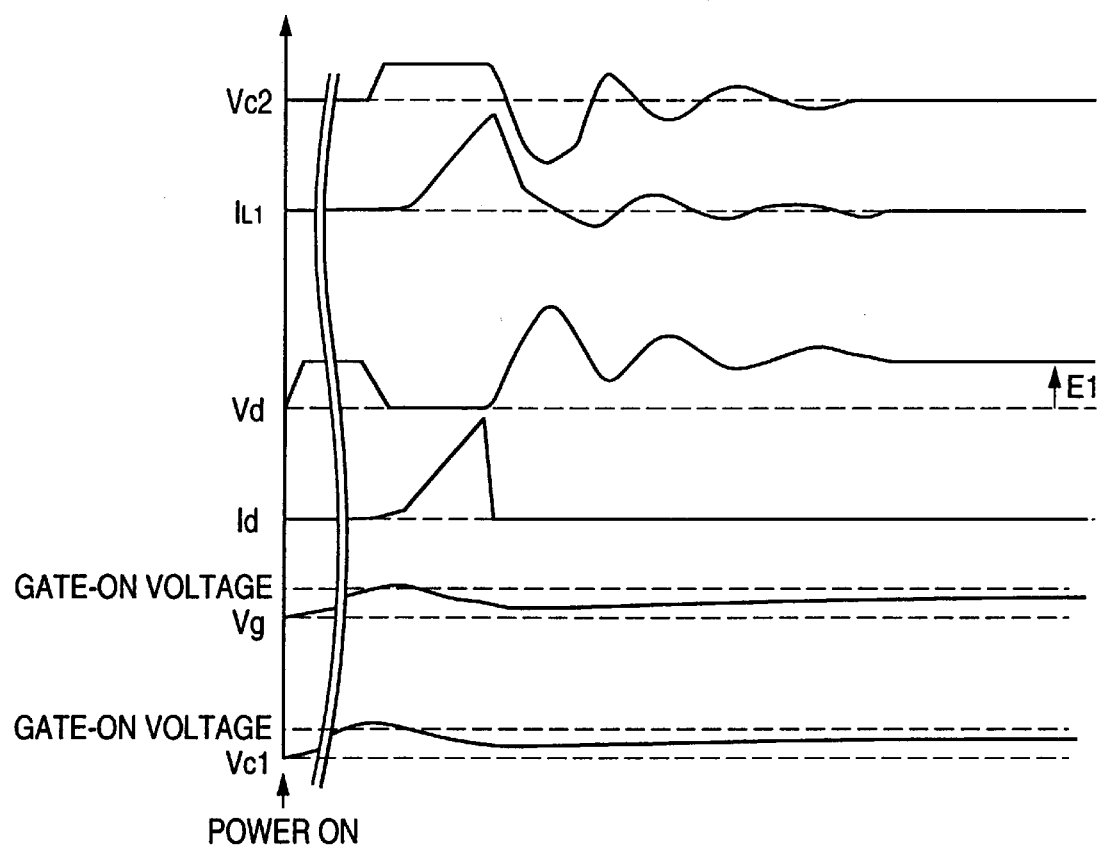
FIG. 5 is a waveform diagram showing waves at various points of the power supplying section in the case where the load section is not attached to the power supplying section.

The operation of the device in the case where the load section 20 is not attached to the power supplying section 10, will be described with reference to FIGS. 1 and 5.

When the power switch S1 is turned on, similarly as in the case where the load section 20 is attached to the power supplying section 10, the capacitor C1 is charged by the DC voltage source E1 through the start resistor R1. In this case, no voltage is induced in the signal transmitting secondary coil Nf2 of the power supplying section 10, and therefore the gate voltage $V_g$ of the switching element FET1 is equal to the bias voltage $V_{C1}$.

When the gate voltage $V_g$ is increased to reach the threshold voltage which turns on the switching element FET1, then the switching element FET1 is turned on, whereby the drain voltage $V_d$ becomes the earth potential. In this case, the resonance voltage $V_{C2}$ becomes substantially equal to the voltage of the DC voltage source E1, and the coil current $I_{L1}$ which increases monotonously flows in the power transmitting primary coil Nm1 of the power supplying section 10.

However, since the load section 20 is not attached to the power supplying section, the feedback loop comprising the power transmitting primary coil Nm1, the power transmitting secondary coil Nm2, the signal transmitting primary coil Nf1, and the signal transmitting secondary coil Nf2 is not formed, and no voltage is induced across the signal transmitting secondary coil Nf2.

Therefore, even when the switching element FET1 is once turned on, immediately the bias voltage $V_{C1}$ is lowered by the discharge through the diode D1. Hence, it is impossible to hold the gate voltage $V_g$ which is necessary to turn on the switching element FET1, so that the switching element FET1 is turned off immediately. That is, as shown in FIG. 5, the resonance voltage $V_{C2}$ is lowered by damping oscillation.

And the capacitor C1 is charged through the start resistor R1 by the DC voltage source E1. Therefore, the oscillation is held stopped until the bias voltage $V_{C1}$ is increased to the gate voltage $V_g$ which turns on the switching element FET1. Accordingly, When the load section 20 is not attached to the power supplying section 10, the oscillation of the power supplying section 10 is an intermittent oscillation.

As was described above, the feedback loop of the self-oscillation circuit is let outside from the power supplying section 10 towards the load section 20. Therefore, in the case where the load section 20 is not attached to the power supplying section 10, no feedback loop is formed, whereby the self-oscillation of the power supplying section 10 becomes an intermittent oscillation. That is, the power loss of the power supplying section can be substantially disregarded. And even if a metal foreign matter or the like is placed near the power supplying section 10, the generation of heat of the foreign-matter, which is due to induction heating or the like, can be prevented.

Especially, by setting the constant values of the start resistor R1 and the capacitor C1 to suitable values (for instance, with respect to about the oscillation period 10 $\mu$sec obtained when the load section 20 is attached to the power supplying section 10 the intermittent period obtained in the case where the load section 20 is not attached to the power supplying section 10 can be set to several hundreds of mill-seconds (msec). The values of the periods are not limited to those described above. The constant values of the start resistor R1 and the capacitor C1 may be set to values which reduces the power loss thereby to save energy.

The invention is not limited to the above-described embodiment. That is, it may be modified as follows:

(1) In the above-described embodiment, the switching element FET1 is a field-effect transistor; however, it may be replaced by an element such as a bi-polar transistor or other switching elements.

Figure 6:
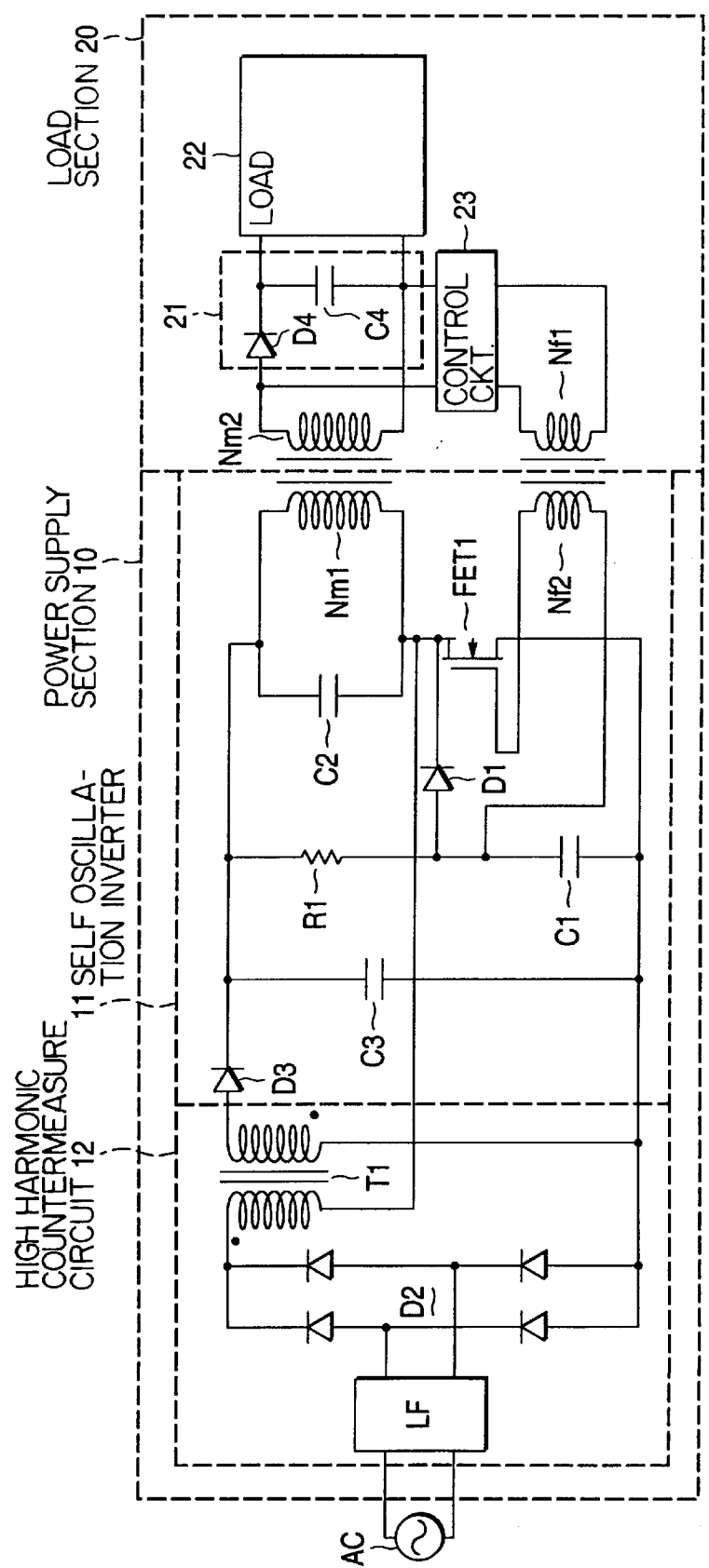
FIG. 6 is a circuit diagram showing a second modification of the non-contact power transmitting device of the invention.

(2) The circuit arrangement of the power supplying section 10 and the load section 20 may be replaced by the circuit arrangement shown in FIG. 6.

In the power supplying section 10, instead of the above-described DC voltage source E1, a DC voltage source is employed which receives power from an AC voltage source. The DC voltage source comprises a self-oscillation inverter 11 operating as class C condition, and a high harmonic countermeasure circuit 12.

The high harmonic countermeasure circuit 12 is made up of a low-pass filter LF, a rectifier bridge diode D2, and a transformer T1, and is to prevent the flow of higher harmonic components from the power supplying section 10 to the AC voltage source AC.

The output voltage of the transformer T1 of the high harmonic countermeasure circuit 12 is rectified by the diode D3, and smoothed by the capacitor C3 to obtain the DC voltage source.

On the other hand, in the load section 20, a control circuit 23 is added to the above-described embodiment, and a diode D4 and a capacitor C4 are provided as the rectifier circuit 21, and a battery is provided as the load 22. The induction voltage of the power transmitting secondary coil Nm2 is half-wave-rectified by the diode D4, and smoothed by the capacitor C4, so that DC power is supplied to the battery which is the load 22.

In the circuit, the signal transmitting primary coil Nf1 is electrically connected through the control circuit 23 to the power transmitting secondary coil Nm2.

The control circuit 23 utilizes the induction voltage of the power transmitting secondary coil Nm2, and the power of the battery 22, to control the voltage level of the signal transmitting primary coil Nf1.

In the modification, in the case where the load section 20 is coupled to the power supplying section 10, the voltage level of the signal transmitting primary coil Nf1 is controlled by the control circuit 23, and the voltage level induced in the feedback coil, namely, the signal transmitting secondary coil Nf2 is controlled, whereby the oscillation of the power supplying section 10 can be controlled from the load section 20. As the control circuit 23, the amplitude control circuit, intermittent oscillation control circuit or the like can be used.

In the case where the load section 20 is not attached to the power supplying section, similarly as in the above-described case the oscillation of the power supplying section 10 becomes intermittent.

Figure 7:
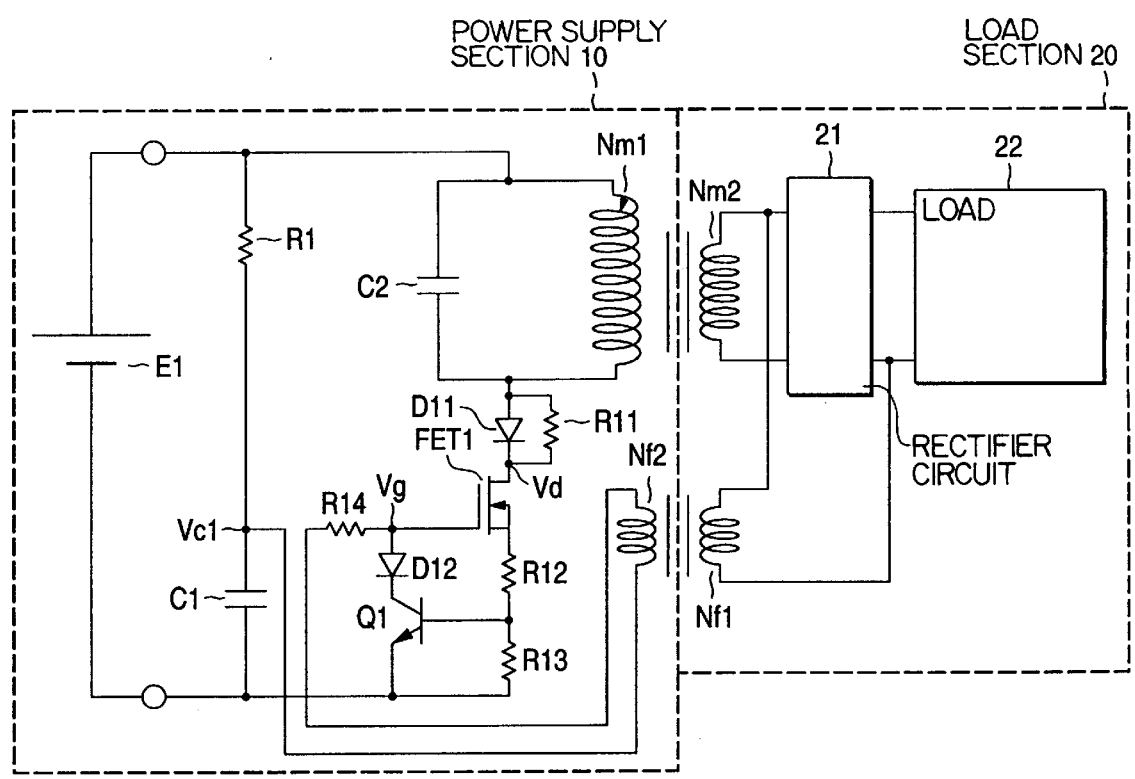
FIG. 7 is a circuit diagram showing a third modification of the non-contact power transmitting device of the invention.

(3) The circuit of the power supplying section 10 may be as shown in FIG. 7.

In the circuit of FIG. 7, a parallel circuit of a diode D11 and a resistor R11 is connected between a resonance circuit of the capacitor C2 and a power transmitting primary coil Nm1 and the drain of the switching element FET1.

The diode D1 operates as follows: When the anode voltage of the diode D1 is going to decreased to negative voltage, while the regenerative current is blocked which is going to flow in the side of the DC powers source E1 through th e inner diode of the switching element FET1, the voltage of the anode of the diode D11 is decreased to negative voltage.

The resistor R11 is to prevent the charge and discharge of the parasitic capacitance from being obstructed by the voltage generated in the resonance circuit because of the insertion of the diode D11.

In the circuit of FIG. 7, a series circuit of resistors R12 and R13 is connected between th e sour ce of the switching element FET1 and ground, and the gate of the switching element FET1 is connected to the anode of the diode D12, and through a resistor R14 to the signal transmitting secondary coil Nf2.

The cathode of the diode D12 is connected to the collector of a transistor Q1. The base of the transistor Q1 is connected to the connecting points of the resistors R12 and R13, and the emitter there of is grounded.

In the circuit of FIG. 7, the diode D1 is not provided, and the resistors R12 through R14, the diode D12 and the transistor Q1 form a bias control circuit.

The operation of the circuit when the circuit is coupled to the power source, will be described. Similarly as in the above-described case, the capacitor C1 is charged through the start resistor R1, so that the bias voltage $V_{C1}$ is increased. And when, because of the bias voltage $V_{C1}$, the gate voltage $V_g$ becomes higher than the "on" voltage of the switching element FET1, the switching element FET1 is turned on, and the coil current $I_{L1}$ flows while the drain voltage $V_d$ decreases. Therefore, a voltage (potential difference) is developed across the power transmitting primary coil Nm1.

As a result, a voltage is induced in the power transmitting secondary coil Nm2 of the load section 20, whereby (owing to the voltage thus induced) a voltage is induced in the signal transmitting primary coil Nf1.

Owing to the voltage thus induced, a voltage $V_{nf2}$ is induced in the signal transmitting secondary coil Nf2 of the power supplying section 10 by electromagnetic induction which is magnetically coupled to the signal transmitting primary coil Nf1 of the load section 20. In this case, the gate voltage $V_g$ is $V_{C1}+V_{nf2}$, and therefore the switching element FET1 is stably in "on" state.

On the other hand, when the voltage across the resistors R12 and R13 is increased by the coil current $I_{L1}$ so that a base current is supplied to the transistor Q1, the latter Q1 is turned on (rendered conductive), so that the gate voltage $V_g$ of the switching element FET1 is decreased, and the switching element FET1 is turned off (rendered non-conductive).

As was described above, when the circuit is coupled to the power source, the "on" time of the switching element FET1 is decreased very much. Therefore, the stored energy attributing to the coil current $I_{L1}$ is suppressed to a suitable value, and the flyback voltage can be suppressed which occurs after the switching element FET1 is turned off.

In the steady state after the circuit is coupled to the power source, similarly, because the transistor Q1 forming the bias control circuit is turned on, the switching element FET1 is turned off, so that the switching of the switching element FET1 is repeatedly carried out.

In the modification, similarly as in the above-described embodiment, in the case where the load section 20 is not coupled to the power supplying section, the oscillation of the power supplying section 10 is intermittent oscillation. That is, the modification has the same effects as the above-described embodiment.

Figure 8A:
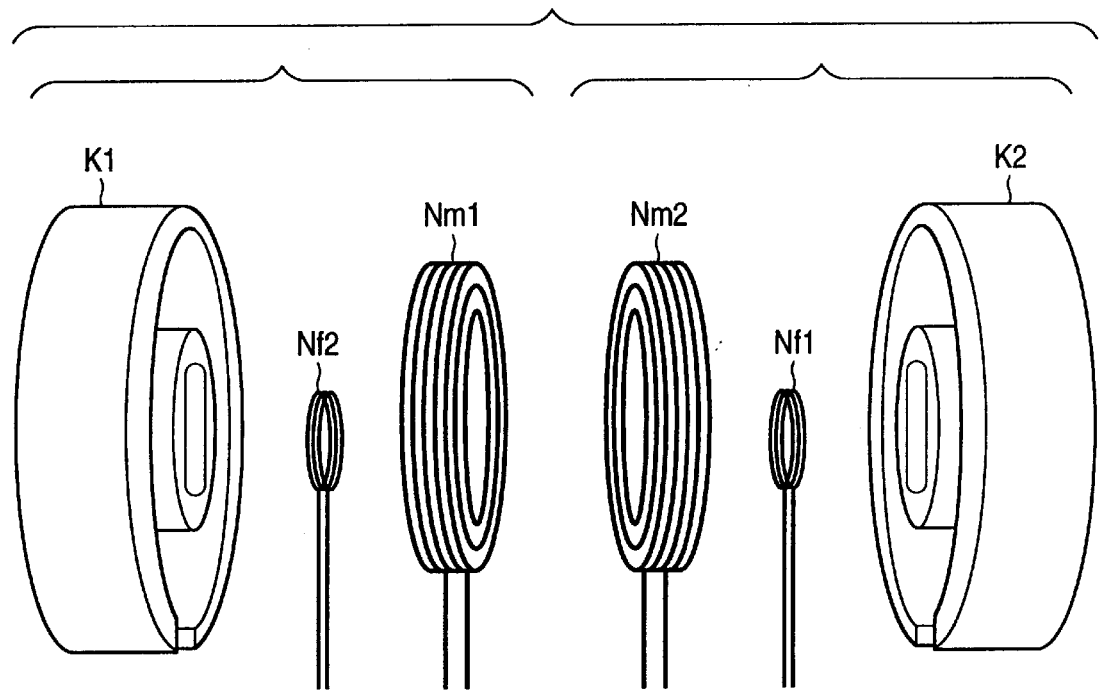
FIGS. 8A and 8B are diagrams showing a fourth modification of the non-contact power transmitting device of the invention.
Figure 8B:
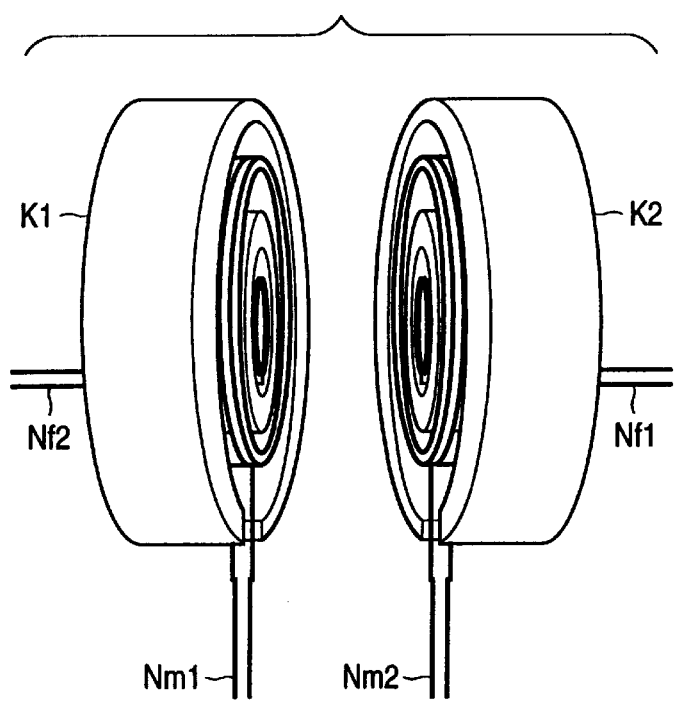

(4) The signal transmitting secondary coil Nf2 of the power supplying section 10, and the signal transmitting primary coil Nf1 of the load section 20 in the above-described embodiment (FIGS. 2A and 2B) may be arranged as shown in FIGS. 8A and 8B.

Figure 9:
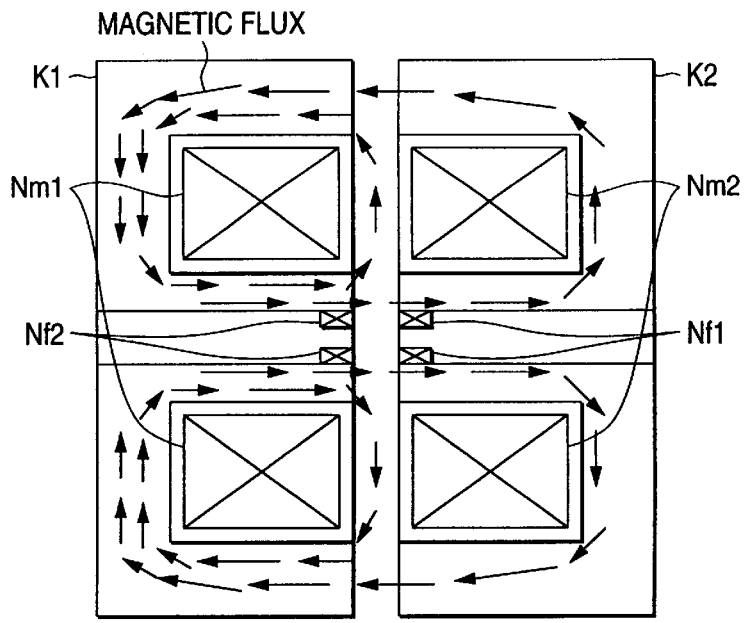
FIG. 9 is a schematic sectional view of the coils in the power supplying section and in the load section magnetic together with magnetic fluxes in FIG. 8B.

As shown in FIGS. 8A and 8B, the signal transmitting secondary coil Nf2 of the power supplying section 10 is arranged the most inside of the transformer pot core K1, that is, inside of the power transmitting primary coil Nm1; that is, inside the magnetic-flux loop attributing to the power transmitting primary coil Nm1, and the magnetic-flux loop attributing to transformer of the power transmitting primary and secondary coils Nm1 and Nm2 as shown in FIG. 9.

On the other hand, the signal transmitting primary coil Nf1 of the load section 20 is arranged at the position where, when the load section 20 is attached to the power supplying section 10, it is confronted with the signal transmitting secondary coil Nf2 of the power transmitting section 10; that is, it is arranged the most inside of the transformer pot core K2, that is inside of the power transmitting secondary coil Nm2.

In the modification, too, the magnetic-flux loop formed by the transformers of the power transmitting primary and second coils Nm1 and Nm2, is located outside; that is, the magnetic fluxes are canceled out outside as viewed from the signal transmitting secondary coil Nf2, and no flux goes across the signal transmitting secondary coil Nf2 as shown in FIG. 9. Therefore, no electromotive force is generated by the magnetic flux of the power transmitting primary coil Nm1. In other words, the signal transmitting secondary coil Nf2 and the power transmitting primary coil Nm1 are not inductively coupled to each other, or even if they are coupled, the coupling condition is to the extent that can be disregarded (only the amount of the flux leakage).

On the other hand, when the load section 20 is attached to the power supplying section 10, the power transmitting primary coil Nm1 and the power transmitting secondary coil Nm2 are magnetically coupled to each other, while the signal transmitting primary coil Nf1 and the signal transmitting secondary coil Nf2 are also magnetically coupled to each other.

In the modification, when the load section 20 is attached to the power supplying section 10, the power transmitting primary coil Nm1, the power transmitting secondary coil Nm2, the signal transmitting primary coil Nf1, and the signal transmitting secondary coil Nf2 form the feedback loop of he self-oscillation circuit; that is, the modification operates in the same manner as the above-described embodiment.

In the case where the load section 20 is not attached to the power supplying section 10, the power transmitting primary coil Nm1, the power transmitting secondary coil Nm2, the signal transmitting primary coil Nf1, and the signal transmitting secondary coil Nf2 do not form the feedback loop of the self-oscillation circuit. Therefore, the oscillation of the power supplying section 10 becomes intermittent oscillation; that is, the modification has the same effects as the above-described embodiment.

Figure 10:
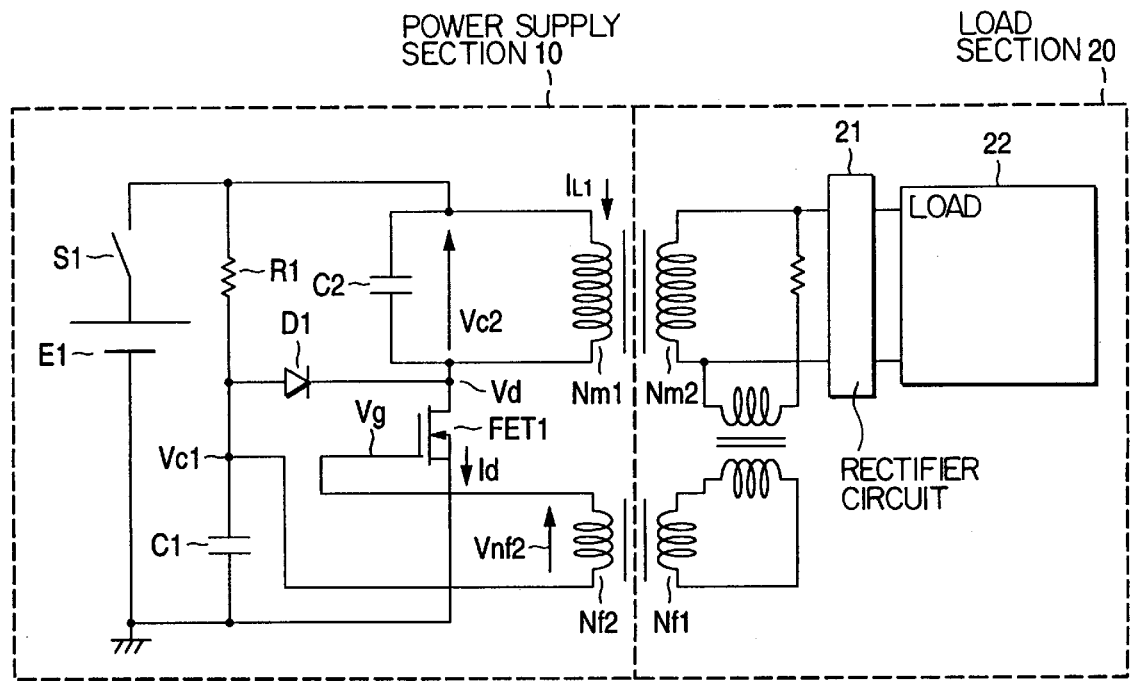
FIG. 10 a circuit diagram showing a fifth modification of the non-contact power transmitting device of the invention.

(5) The circuit of the load section 20 may be as shown in FIG. 10.

In the above embodiments, the power transmitting secondary coil Nm2 and the signal transmitting primary coil Nf1 are electrically coupled to each other. However, the signal transmitting primary coil Nf1 can be magnetically coupled to the power transmitting secondary coil Nm2 as shown in the circuit of FIG. 10.

According to the invention, the non-contact power transmitting device comprises the power supplying section having the power transmitting primary coil in which coil current is switched by the switching element, and the load section having the power transmitting secondary coil in such a manner that the power supplying section and the load section are detachably attached to each other. The load section has the signal transmitting primary coil which is electrically or magnetically coupled to the power transmitting secondary coil. The power supplying section has the signal transmitting secondary coil which is not coupled to the power transmitting primary coil not only electrically but also magnetically, and which is magnetically coupled to the signal transmitting primary coil with the load section coupled to the power supplying section, and is electrically connected, as a feedback coil, to the control terminal of the switching element. And, with the load section attached to the power supplying section, the power transmitting primary coil, the power transmitting secondary coil, the signal transmitting primary coil, and the signal transmitting secondary coil form the feedback loop of the self-oscillation circuit. Therefore, when the load section is not coupled to the power supplying section, the signal transmitting secondary coil is not inductively coupled to the power transmitting primary coil not only, and the power transmitting primary coil, the power transmitting secondary coil, the signal transmitting primary coil, and the signal transmitting secondary coil do not form the feedback loop of the self-oscillation circuit, so that no voltage is induced in the feedback coil, namely, the signal transmitting secondary coil. Accordingly, the switching of the coil current by the switching element can be intermittently carried out, whereby, when the load section is not coupled to the power supplying section, the self-oscillation can be decreased with a simple circuit.

Accordingly, when the load section is not attached to the power supplying section, the power consumption can be decreased. Furthermore, even in the case where a metallic foreign matter is placed near the power supplying section, it is prevented from being heated. In addition, the circuit is very simple, and the device can be manufactured at low cost.

According to the invention, the load section has the control circuit which controls the voltage level of the signal transmitting primary coil, so that the oscillation of the self-oscillation circuit of the power supplying section is controlled, whereby the level of the power supplied to the load section is controlled.

According to the invention, the power supplying section has the capacitor connected in parallel to the power transmitting primary coil, thus forming a resonance circuit. Therefore, in the case where the load section is coupled to the power supplying section, the self-oscillation is carried out with high efficiency.

According to the invention, the signal transmitting secondary coil is arranged outside of the magnetic-flux loop of the power transmitting primary coil, and with the load section coupled to the power supplying section, the signal transmitting primary coil is arranged confronted with the signal transmitting secondary coil. Hence, the state that the signal transmitting secondary coil is not inductively coupled to the power transmitting primary coil, can be realized with a simple circuit. In addition, in the case where the load section is coupled to the power supplying section, the magnetic coupling of the signal transmitting primary coil and the signal transmitting secondary coil is realized with a simple circuit.

According to the invention, the signal transmitting secondary coil is arranged inside of the magnetic-flux loop of the power transmitting primary coil, and with the load section coupled to the power supplying section, the signal transmitting primary coil is arranged confronted with the signal transmitting secondary coil. Hence, the state that the signal transmitting secondary coil is not inductively coupled to the power transmitting primary coil, can be realized with a simple circuit. In addition, in the case where the load section is coupled to the power supplying section, the magnetic coupling of the signal transmitting primary coil and the signal transmitting secondary coil is realized with a simple circuit.

What is claimed is:

1. A non-contact power transmitting device comprising:
   (A) a power supplying section comprising:
   a voltage source;
   a start resistor connected to said voltage source;
   a first capacitor connected to said voltage source;
   a power transmitting primary coil;
   a signal transmitting secondary coil which is not inductively coupled to said power transmitting primary coil; and
   a switching element having a control terminal, wherein, said start resistor and said first capacitor apply a bias voltage to said control terminal of said switching element, and when the bias voltage applied to said control terminal becomes higher than a threshold voltage, said switching element switches a current from said voltage source to said power transmitting primary coil; and (B) a load section comprising:

a power transmitting secondary coil; and a signal transmitting primary coil being electrically and magnetically coupled to said power transmitting secondary coil, wherein, when said load section is attached to said power supplying section, said power transmitting primary coil and said power transmitting secondary coil are magnetically coupled to each other, so that power is transmitted from said power supplying section to said load section by electromagnetic induction, said signal transmitting secondary coil is magnetically coupled to said signal transmitting primary coil and electrically coupled to said control terminal as a feedback coil, and said power transmitting primary coil, said power transmitting secondary coil, said signal transmitting primary coil, and said signal transmitting secondary coil form a feedback loop.

2. A non-contact power transmitting device according to claim 1, wherein the load section further includes a control circuit connected to said signal transmitting primary coil so as to control a voltage level induced in the signal transmitting primary coil.

3. A non-contact power transmitting device according to claim 1, wherein said power supplying section further includes a second capacitor connected in parallel to said power transmitting primary coil.

4. A non-contact power transmitting device according to claim 1, wherein said signal transmitting secondary coil is arranged outside of a magnetic-flux loop of said power transmitting primary coil, and said signal transmitting primary coil is arranged so as to be confronted with said signal transmitting secondary coil when said load section is attached to said power supplying section.

5. A non-contact power transmitting device according to claim 1, wherein said signal transmitting secondary coil is arranged inside of a magnetic-flux loop of said power transmitting primary coil, and said signal transmitting primary coil is arranged so as to be confronted with said signal transmitting secondary coil when said load section is attached to said power supplying section.

* * * * *